(12) United States Patent
Takishima et al.

(10) Patent No.: US 6,856,650 B1
(45) Date of Patent: *Feb. 15, 2005

(54) METHOD AND APPARATUS FOR SECOND OR LATER GENERATION CODING OF VIDEO SIGNAL

(75) Inventors: Yasuhiro Takishima, Tokyo (JP); Shigeyuki Sakazawa, Tokyo (JP); Masahiro Wada, Kanagawa (JP)

(73) Assignee: Kokusai Denshin Denwa Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1299 days.

(21) Appl. No.: 08/893,379

(22) Filed: Jul. 11, 1997

(30) Foreign Application Priority Data

Jul. 16, 1996 (JP) ............................................ 8/204200
Jul. 16, 1996 (JP) ............................................ 8/204201

(51) Int. Cl.[7] ............................................. H04B 1/66
(52) U.S. Cl. ............ 375/240; 375/240.03; 375/240.02; 375/240.04; 375/240.23; 341/200; 341/51

(58) Field of Search ................................ 348/422, 405, 348/396, 416; 358/138, 183; 375/240, 240.03, 240.02, 240.04, 240.23, 240.24, 240.26, 240.13, 240.18; 341/200, 51

(56) References Cited

U.S. PATENT DOCUMENTS

| | | | | |
|---|---|---|---|---|
| 4,941,044 A | * | 7/1990 | Trew ........................... | 358/138 |
| 5,079,547 A | * | 1/1992 | Fuchigama et al. ........... | 341/51 |
| 5,214,506 A | * | 5/1993 | Lin et al. ..................... | 358/183 |
| 5,367,335 A | * | 11/1994 | Murakami et al. .......... | 348/405 |
| 5,412,428 A | * | 5/1995 | Tahara ......................... | 348/396 |
| 5,485,214 A | * | 1/1996 | Lin et al. ..................... | 348/416 |

OTHER PUBLICATIONS

"A Study Quality Control Strategy in Second Generation Video Coding", Takishima et al *Proceedings of the 1996 ITE Annual Convention*, published Jul. 17, 1996, pp. 376–377.

* cited by examiner

Primary Examiner—Shawn S. An
(74) Attorney, Agent, or Firm—Arent Fox PLLC

(57) ABSTRACT

At second or later generation coding of video signal in tandem video coding, at least one coding parameter of previous coding is estimated in accordance with picture properties of the input video signal, and the estimated coding parameter in the previous coding is used in the second or later coding.

24 Claims, 9 Drawing Sheets

———□——— Q4, FLAT MATRIX
----◇---- Q4, NON-FLAT
—·—○—·— Q12, FLAT MATRIX
———△——— Q12, NON-FLAT

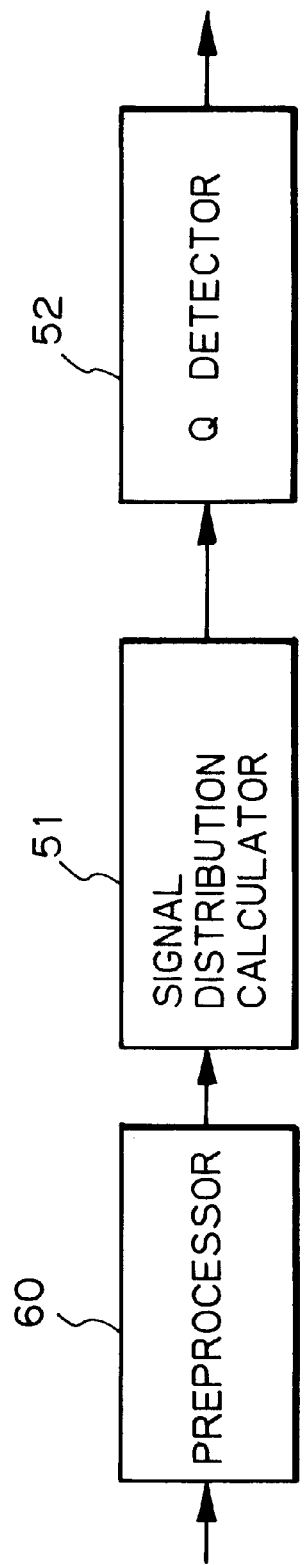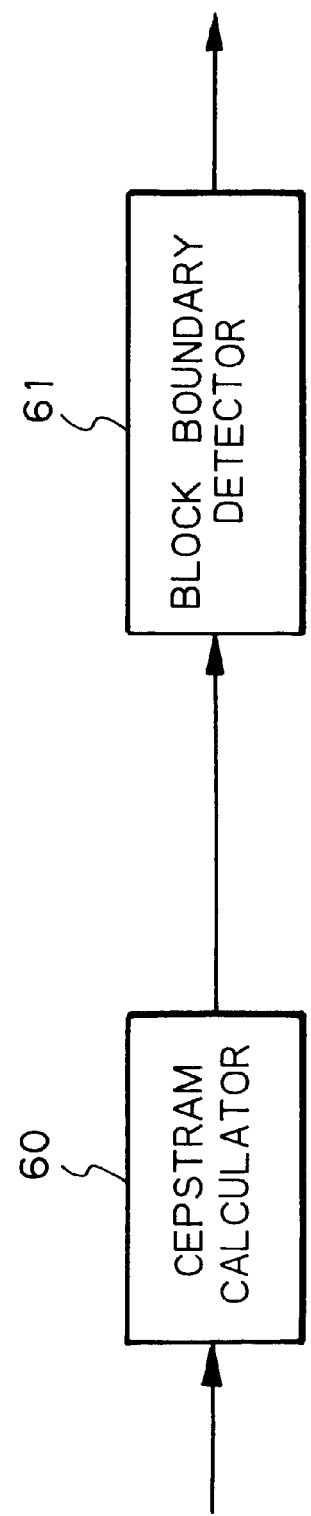

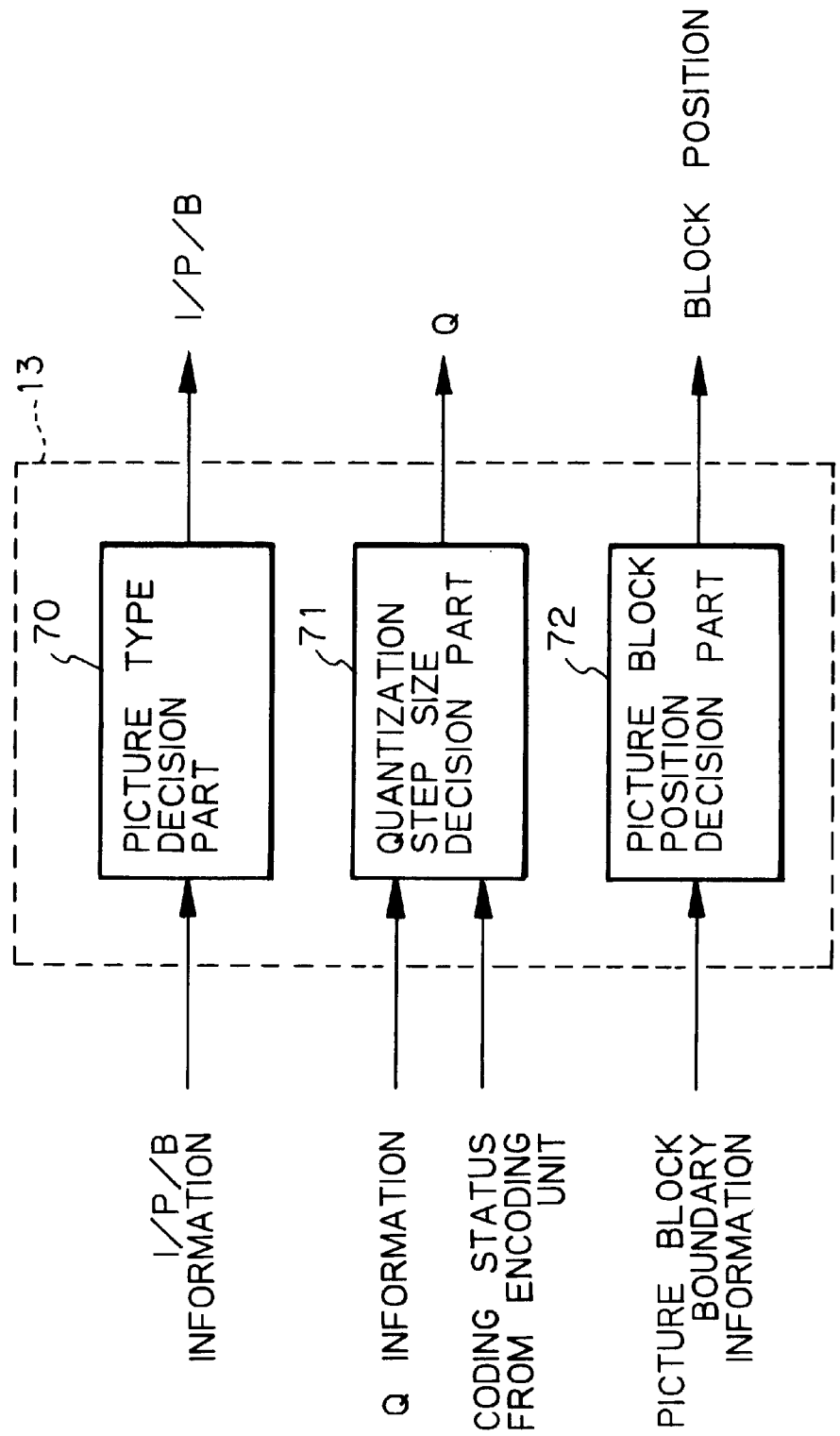

METHOD AND APPARATUS FOR SECOND OR LATER GENERATION CODING OF VIDEO SIGNAL

FIELD OF THE INVENTION

The present invention relates to a method and apparatus for second or later generation coding of a video signal in tandem video coding. Particularly, the present invention relates to a method and apparatus for second or later coding of video signal used for example in a digital television transmission, in a digital video storing and transmission system, and in a video database.

DESCRIPTION OF THE RELATED ART

Recently, applications have increased for decoding a coded bit stream into a digital video signal and for tandem coding of the decoded digital video signal under different coding conditions so as to store or transmit these tandem coded information. For example, in the broadcasting field, a contribution of video source, a primary distribution between television broadcasting stations, a secondary distribution to each home, and a tandem transmission of digital signals with sequential editing and coding processes have been executed. Also, another transmission configurations with higher flexibility have been developed according to increasing of the variety of broadcasting configurations. Video clips stored for example in the video database and used as libraries, whose sources are supplied from many users may be also popularly utilized and repeatedly stored and transmitted with tandem editing and coding processes.

As is known, once the video signal is coded, this video signal has a history of being coded. However, according to the conventional tandem coding technique, the second or later generation coding is executed without considering the coding history of the video signal. In other words, the second or later coding is executed with considering only independent parameters of each encoder such as for example a compression ratio of that encoder.

Applicants have quantitatively analyzed that the conventional second coding executed without regard for the coding history would cause considerable degradation of picture quality, and thus have already proposed a second generation coding method of determining coding parameters so that the determined parameters are adapted to coding parameters used in the previous coding and of executing a second coding of the video signal using the determined coding parameters (Japanese Unexamined Patent Publication No. 8(1996)-111870).

This already proposed method will be effective when coding parameters of previous coding are obtained together with the video signal. However, when the coding parameters of previous coding are not directly provided together with the video signal, for example in case the video signal is provided by means of a digital video tape, the above-mentioned proposed method cannot be utilized.

SUMMARY OF THE INVENTION

It is therefore an object of the present invention to provide a method and apparatus for second or later generation coding of video signal, whereby a good picture quality can be expected with respect to video signal provided with a history of being coded even if no coding parameter of previous cooing is directly available.

Another object of the present invention is to provide a method and apparatus for second or later generation coding of video signal, whereby the picture quality with respect to video signal provided with a history of being coded can be further improved.

According to the present invention, a method for second or later generation coding of video signal in tandem video coding is provided. Particularly, the method includes a step of, estimating at least one coding parameter of previous coding in accordance with picture properties of the input video signal, and a step of secondly coding the input video signal based upon the estimated coding parameter in the previous coding.

According to the present invention, furthermore, an apparatus for second or later generation coding of video signal in tandem video coding is provided. The apparatus particularly includes a unit for estimating at least one coding parameter of previous coding in accordance with picture properties of the input video signal, and a unit for secondly coding the input video signal based upon the estimated coding parameter in the previous coding.

At second or later generation coding of video signal in tandem video coding, at least one coding parameter of previous coding is estimated in accordance with picture properties of the input video signal, and the estimated coding parameter in the previous coding is utilized in the second or later coding. Thus, a good picture quality can be expected with respect to the video signal provided with a coding history even if no coding parameter of previous coding is directly available.

It is preferred that cycle and phase of at least one picture type of previous coding are estimated in accordance with picture properties of the input video signal.

It is also preferred that the input video signal is coded by using the picture type, a value representing picture quality of the coded video signal such as a SNR is calculated, and then a phase of the picture type is picked up based upon the calculated value.

Particularly, it is preferred that the phase estimation is an estimation of I-picture of previous coding in accordance with picture properties of the input video signal.

It is also preferred that the cycle estimation is an estimation of GOP cycle and/or I/P-picture cycles of previous coding in accordance with picture properties of the input video signal.

Preferably, a quantization step size of previous coding is estimated in accordance with picture properties of the input video signal.

It is preferred that a picture block boundary of previous coding is also estimated in accordance with picture properties of the input video signal.

It is also preferred that a quantization step size of a second coding $Q_2$ with respect to a quantization step size of the previous coding $Q_1$ is decided so as to satisfy $Q_2 \geq Q_1$ and $Q_2 = n \times Q_1$, where n is a natural number, and that the secondly coding is to code the input video signal based upon the decided quantization step size $Q_2$.

Preferably, whether the input video signal is provided with coding parameter information of the previous coding is detected, and the estimation is enable only when the input video signal is provided with the previous coding parameter information.

According to the present invention also, a method for second or later generation coding of video signal in tandem video coding includes a step of deciding a quantization step size of a second coding $Q_2$ with respect to a quantization step size of the previous coding $Q_1$ so as to satisfy $Q_2 \geq Q_1$ and $Q_2=n \times Q_1$, and a step of secondly coding the input video signal based upon the decided quantization step size $Q_2$.

Furthermore, according to the present invention, an apparatus for second or later generation coding of video signal in tandem video coding includes a unit for deciding a quantization step size of a second coding $Q_2$ with respect to a quantization step size of the previous coding $Q_1$ so as tol satisfy $Q_2 \geqq Q_1$ and $Q_2=n \times Q_1$, and a unit for secondly coding the input video signal based upon the decided quantization step size $Q_2$.

By deciding the second quantization step size $Q_2$ using Q-rules as above-described, the picture quality with respect to video signal provided with a coding history can be further improved.

It is preferred that the quantization step size of the previous coding $Q_1$ is estimated in accordance with picture properties of the input video signal, or that the quantization step size of the previous coding $Q_1$ is accompanied with the input video signal.

Further objects and advantages of the present invention will be apparent from the following description of the preferred embodiments of the invention as illustrated in the accompanying drawings.

BRIEF DESCRIPTION OF THE DRAWINGS

FIG. 5 shows a block diagram schematically illustrating a quantization step size estimator in the preprocessing unit shown in FIG. 2;

FIG. 6 shows a block diagram schematically illustrating a block boundary estimator in the preprocessing unit shown in FIG. 2;

FIG. 7 shows a block diagram schematically illustrating a coding control unit in the apparatus of FIG. 1;

DESCRIPTION OF THE PREFERRED EMBODIMENTS

Figure 1:
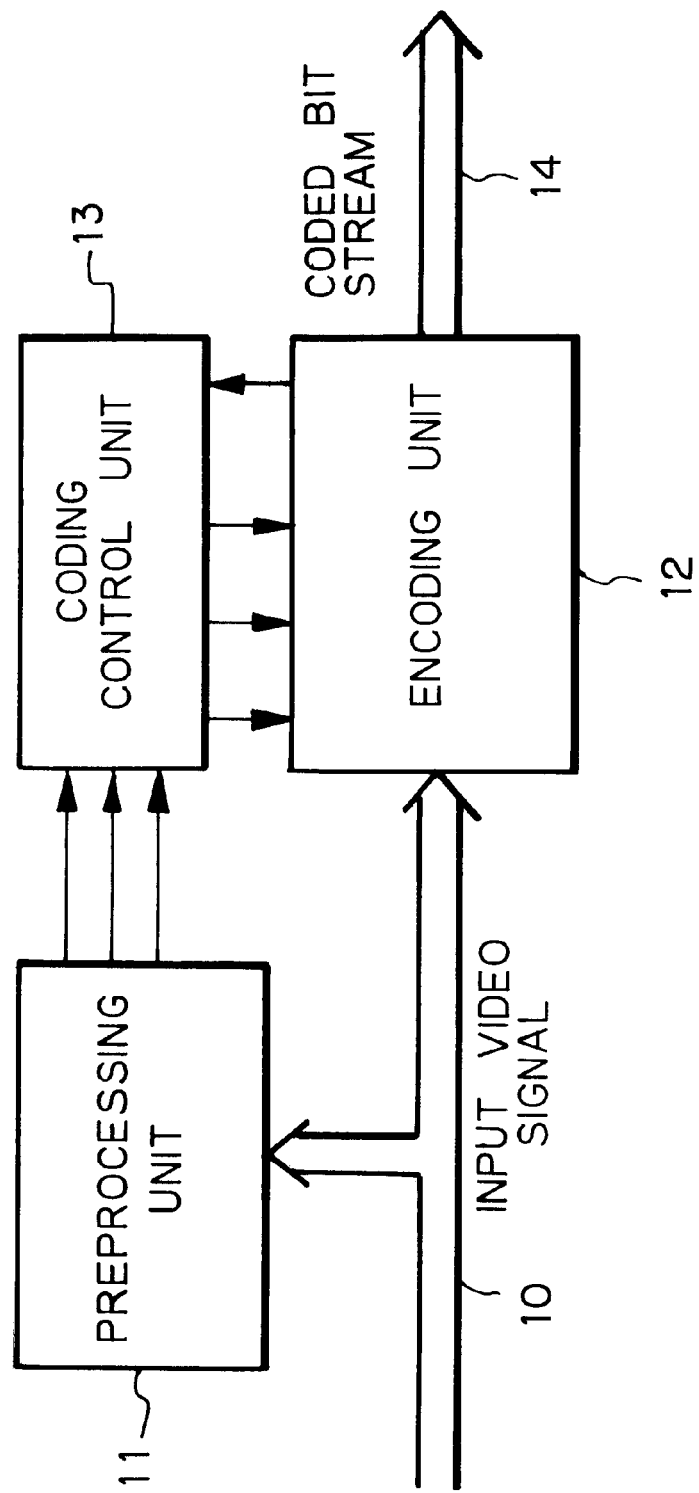
FIG. 1 shows a block diagram schematically illustrating a preferred embodiment of a second generation video coding apparatus according to the present invention.

In FIG. 1 which schematically illustrates a preferred embodiment of a second generation video coding apparatus according to the present invention, reference numeral 10 denotes an input line through which a video signal not having a coding history (original video signal) or a video signal having a coding history in MPEG-2 (coded video signal) are input with or without coding parameters of previous coding, 11 denotes a preprocessing unit for reading out the coding parameters of previous coding which parameters are input together with the video signal for each frame or for estimating the coding parameters of previous coding based upon input video signal properties, 12 denotes an encoding unit for encoding the input video signal provided with or without a coding history so as to compress the information, 13 denotes a coding control unit for controlling the coding operation of the encoding unit 12 in accordance with the previous coding parameters from the preprocessing unit 11, and 14 denotes an output line through which coded bit stream from the encoding unit 12 are output, respectively. This apparatus shown in FIG. 1 operates as a first coding apparatus when video signal provided with no history of being coded (original video signal) is applied, and operates as a second or later coding apparatus when video signal provided with a history of being coded (coded video signal) is applied.

Figure 2:
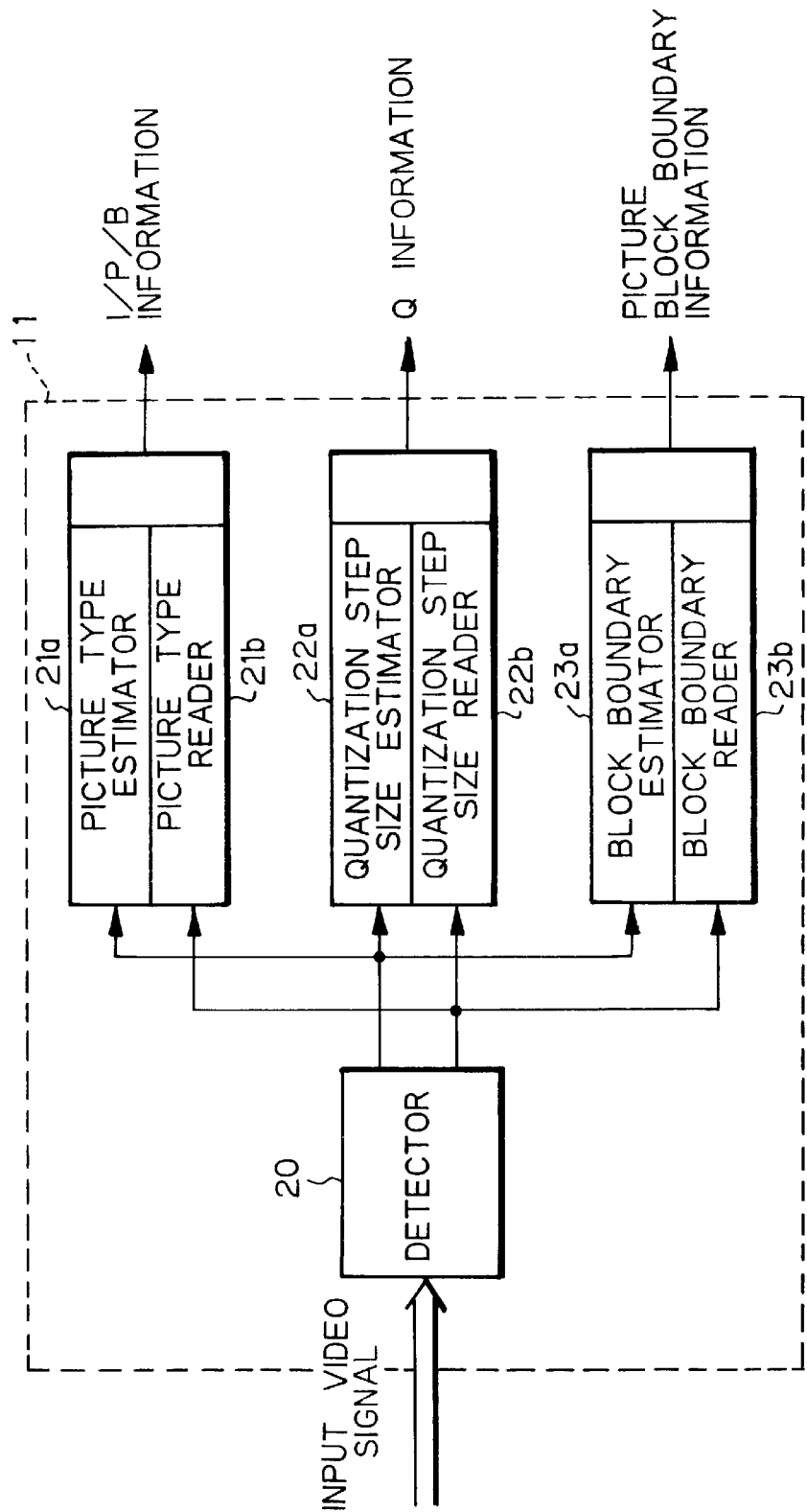
FIG. 2 shows a block diagram schematically illustrating a preprocessing unit in the apparatus of FIG. 1.

FIG. 2 illustrates the preprocessing unit 11 in the apparatus of FIG. 1. In the figure, reference numeral 201 denotes a detector for detecting whether the input video signal is provided with coding parameter information of previous, coding or not, 21a denotes a picture type estimator for estimating a picture type (I/P/B) used for processing each frame in the previous coding as for a previous coding parameter and for outputting the estimated I/P/B information, 21b denotes a picture type reader for reading out a picture type (I/P/B) used for processing each frame in the previous coding as for a previous coding parameter and for outputting the extracted I/P/B information, 22a denotes a quantization step size estimator for estimating a quantization step size (Q) used in the previous coding as for a previous coding parameter and for outputting the estimated Q information, 22b denotes a quantization step size reader for reading out a quantization step size (Q) used in the previous coding as for a previous coding parameter and for outputting the extracted Q information, 23a denotes a block boundary estimator for estimating a block boundary in the previous coding as for a previous coding parameter and for outputting the estimated picture block boundary information, and 23b denotes a block boundary reader for reading out a picture block boundary in the previous coding as for a previous coding parameter and for outputting the extracted picture block boundary information, respectively.

When the detector 20 detects that the input video signal is provided with no coded parameter of previous coding (namely, with no previous coded parameter in spite of having a coding history, or with no coding history), the picture type estimator 21a, the quantization step size estimator 22a or the block boundary estimator 23a operates to estimate each coded parameter. Contrary to this, when the input video signal is provided with a coded parameter of previous coding, the picture type reader 21b, the quantization step size reader 22b or the block boundary reader 23b operates to extract each coded parameter. The picture type reader 21b, the quantization step size reader 22b and the block boundary reader 23b are constituted so as to only read out the respective coded parameters recorded in headers of each frame. The preprocessing unit 11 may be constituted only by the picture type estimator 21a, the quantization step size estimator 22a and the block boundary estimator 23a without having the picture type reader 21b, the quantization step size reader 22b and the block boundary reader 23b. In this case, coded parameters are estimated for all the input video signal.

Figure 3:
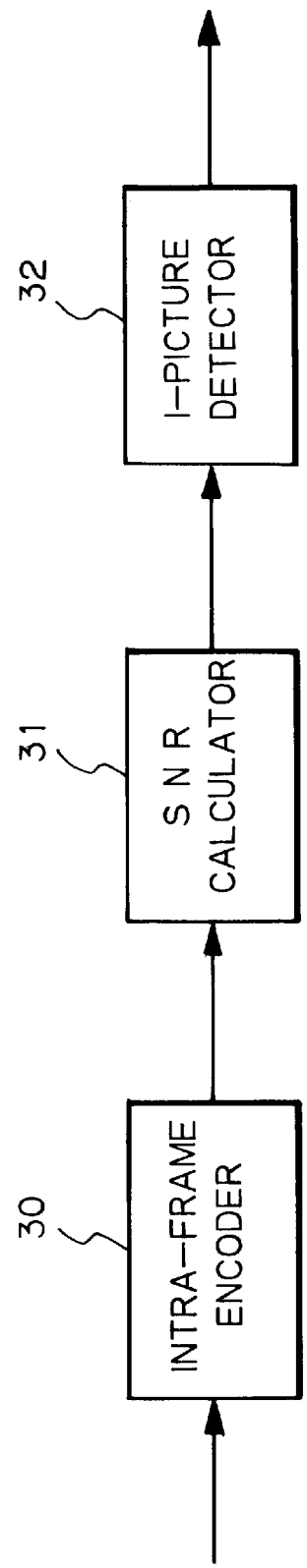
FIG. 3 shows a block diagram schematically illustrating a picture type estimator in the preprocessing unit shown in FIG. 2.

FIG. 3 illustrates an example of the picture type estimator 21a shown in FIG. 2.

In this example, the picture type estimator 21a picks up I-picture in intra-frame coding and has an intra-frame encoder 30 for intra-coding all frames of the input video signal (the quantization step size Q is fixed), a SNR calculator 31 for a SNR from the coded bit stream and an I-picture detector 32 for detecting a phase of I-picture (frame position) from the calculated SNR.

Figure 4:
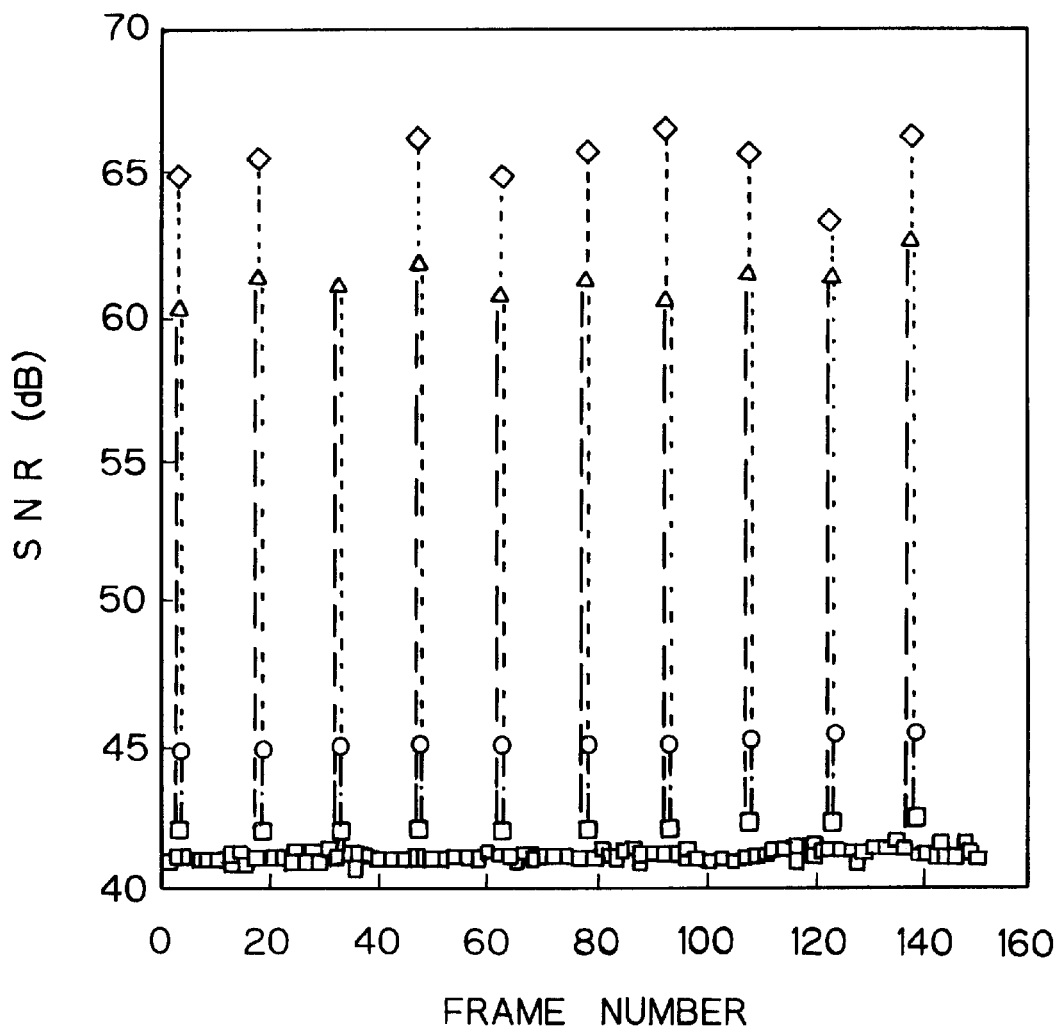
FIG. 4 illustrates characteristics of intra-coding SNR as criteria for I-picture pick-up.

FIG. 4 illustrates characteristics of the intra-coding SNR as criteria for I-picture pick-up. In the figure, the abscissas indicates a frame number and the ordinate indicates a SNR. As for parameters, a quantization step size, a quantization matrix and a kind of picture are used. As will be understood from this figure, the intra-coding SNR is not dependent upon the quantization matrix, the previous quantization and the kind of picture, and a frame processed by I-picture in the previous coding has a higher SNR than that of a frame processed by another picture type (P-picture or B-picture). Thus, by using the intra-coding SNR, a frame position of I-picture can be easily detected.

The picture type estimator 21a shown in FIG. 3 picks up only I-picture. However, in modifications, P-picture may be picked up as the same manner after the I-picture pick-up. It is a matter of course that B-picture position can be automatically detected if I-picture and P-picture are picked up.

FIG. 5 illustrates an example of the quantization step size estimator 22a shown in FIG. 2.

The quantization step size estimator 22a in this example has a preprocessor 50 for preprocessing (for example DCT processing or ME processing) the input video signal, a signal distribution calculator 51 for calculating distribution of the preprocessed signal and a Q detector 52 for detecting a quantization step size of the previous coding from the calculated distribution.

FIG. 6 illustrates an example of the block boundary estimator 23a shown in FIG. 2.

This block boundary estimator 23a has a Cepstram calculator 60 for calculating Cepstram of the video signal and a block boundary detector 61 for judging a blocky noise location to detect a picture block boundary. Since blocky noises are periodically produced during the block coding of picture, this estimator 23a estimates the block boundary by calculating Cepstram of the video signal. Such properties of Cepstram information are described for example in H. Koda et al., "On Basic Properties of Cepstral Information for Image Signals", Proc. of 1995 Congress of Electro Information Communication Society, D-361, Page 87, March 1995.

FIG. 7 illustrates the coding control unit 13 shown in FIG. 1.

This coding control unit 13 receives picture-representing values and coding status from the encoding unit 12 as well as coding parameters of previous coding from the preprocessing unit 11, and decides coding parameters adapted to the encoding unit 12 by referring the received information to control operations of this encoding unit 12. If video signal with no coding history is input, the coding control unit 13 controls second coding in accordance with initial coding parameters. Namely, the unit 13 executes coding control which is the same as the coding control in a single coding, with reference to only picture-representing values (properties of input picture) and coding status from the encoding unit 12.

As illustrated in the figure, the coding control unit 13 has a picture type decision part 70 for deciding, at each frame, picture type used in the current second coding based upon I/P/B information of previous coding provided from the picture type estimator 21a or from the picture type reader 21b in the preprocessing unit 11, a quantization step size decision part 71 for deciding, at each macro block, a quantization step size used in the current second coding based upon Q information of previous coding provided from the quantization step size estimator 22a or from the quantization step size reader 22b in the preprocessing unit 11 and upon picture-representing values and coding status from the encoding unit 12, and a picture block position decision part 72 for deciding, at each process of sequential coded pictures, picture block boundary used in the current second coding based upon picture block boundary information of previous coding provided from the block boundary estimator 23a or from the block boundary reader 23b in the preprocessing unit 11.

The picture type decision part 70 decides picture type of each frame used in the current second coding in accordance with the input I/P/B information. If the previous coding picture type is I-picture type, this decision part 70 selects I-picture type. It is the most important to coincide the phase of I-picture frame in the second coding with that in the previous coding. With respect to P-picture and B-picture, their phases in the second coding may be coincided with these in the previous coding.

As is well known, MPEG-2 periodically combines three different picture types, I-picture for intra-frame coding, P-picture for inter-frame coding with forward prediction, and B-picture for inter-frame with bi-directional prediction to improve coding efficiency. Because picture frames predicted and coded by the respective picture types have different signal properties, it is necessary in second coding to select an optimum prediction picture type with considering the previous coding picture type. Namely, synchronization of the cycle of the picture types such as GOP cycle (N) and I/P cycle (M) as well as synchronization of the phase of the picture types with respect to these in the previous coding can minimize picture quality degradation.

Figure 8:
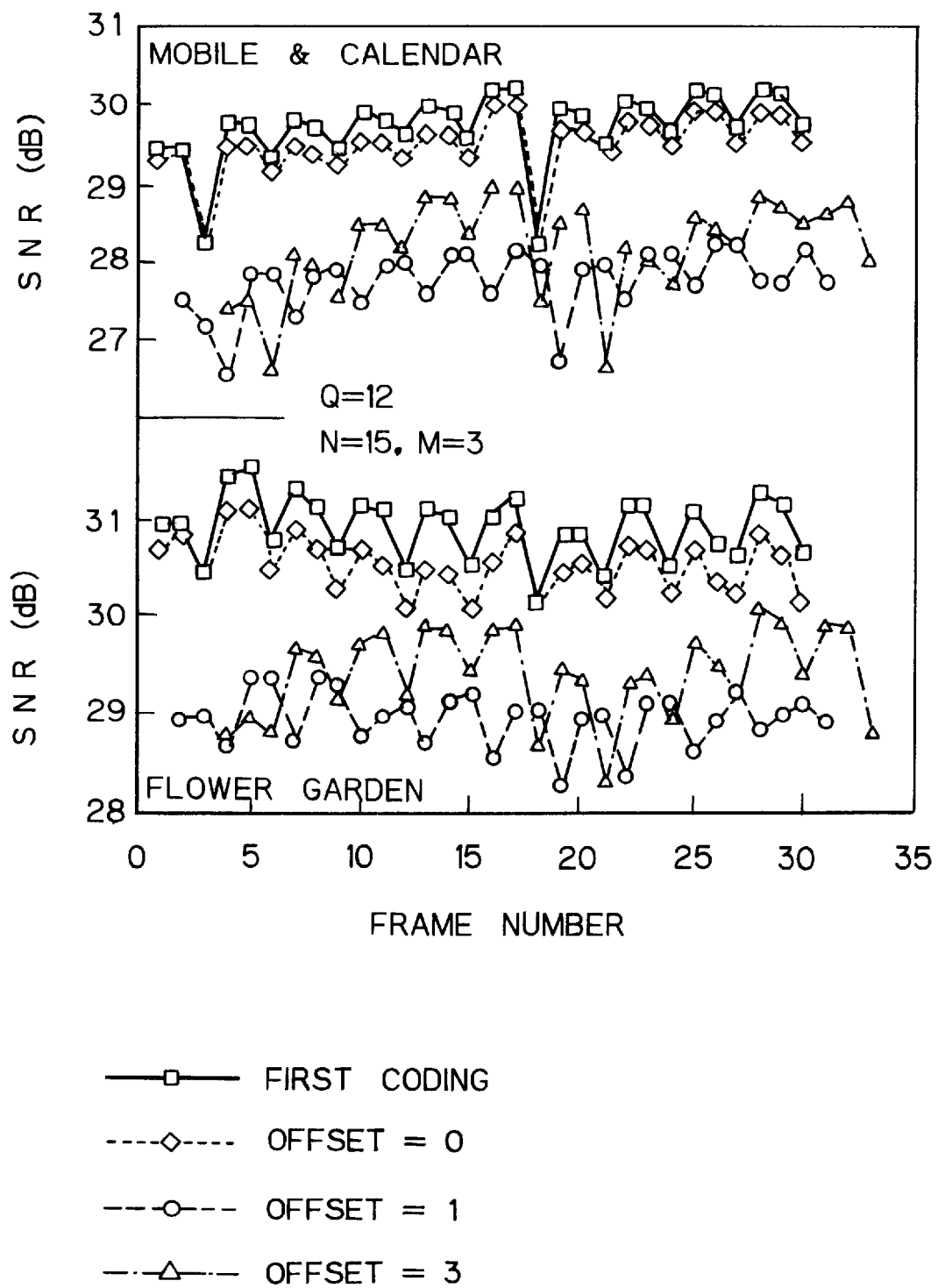
FIG. 8 illustrates characteristics of SNR transition in second coding with frame offset.

FIG. 8 illustrates characteristics of coded picture quality of two kinds of picture (Mobile & Calender and Flower Garden) in second coding with different phases. The second coding is executed by fixing the cycle of picture types (N=15, M=3). In the figure, the abscissas indicates a frame number and the ordinate indicates SNRs of two kinds of picture. As for a parameter, frame offset is used. The quantization step size Q is constant (Q=12).

It will be understood from this figure that quality degradation can be reduced by coinciding the phases of I/P-pictures and that, in order to minimize the quality degradation, coincidence of GOP phases (location of I-picture) will be additionally necessary.

The quantization step size decision part 71 selects an optimum quantization step size adapted to a bit rate in the second coding based upon Q-information, picture-representing values and coding status. In this example, particularly, the quantization step size of second coding $Q_2$ is decided to satisfy the following Q-rules with respect to the quantization step size of previous coding $Q_1$. Namely, the quantization step size $Q_2$ is determined to satisfy Q-rules of $Q_2 \geq Q_1$ and $Q_2 = n \times Q_1$, where n is a natural number.

In general, since signal level distribution of a picture with a history of being coded greatly differs from that of a picture with no history of being coded due to quantization, there is no simple relationship between the quantization step size and the quantization noise. In other words, the coding noise complicatedly varies in accordance with combinations of quantization step sizes of previous and second coding. However, this complicated relationship can be represented by predetermined relationship equation. Thus, it is necessary to consider the quantization step size of previous coding by using the relationship equation (Q-rules) when the quantization step size of second coding is determined.

Figure 9:
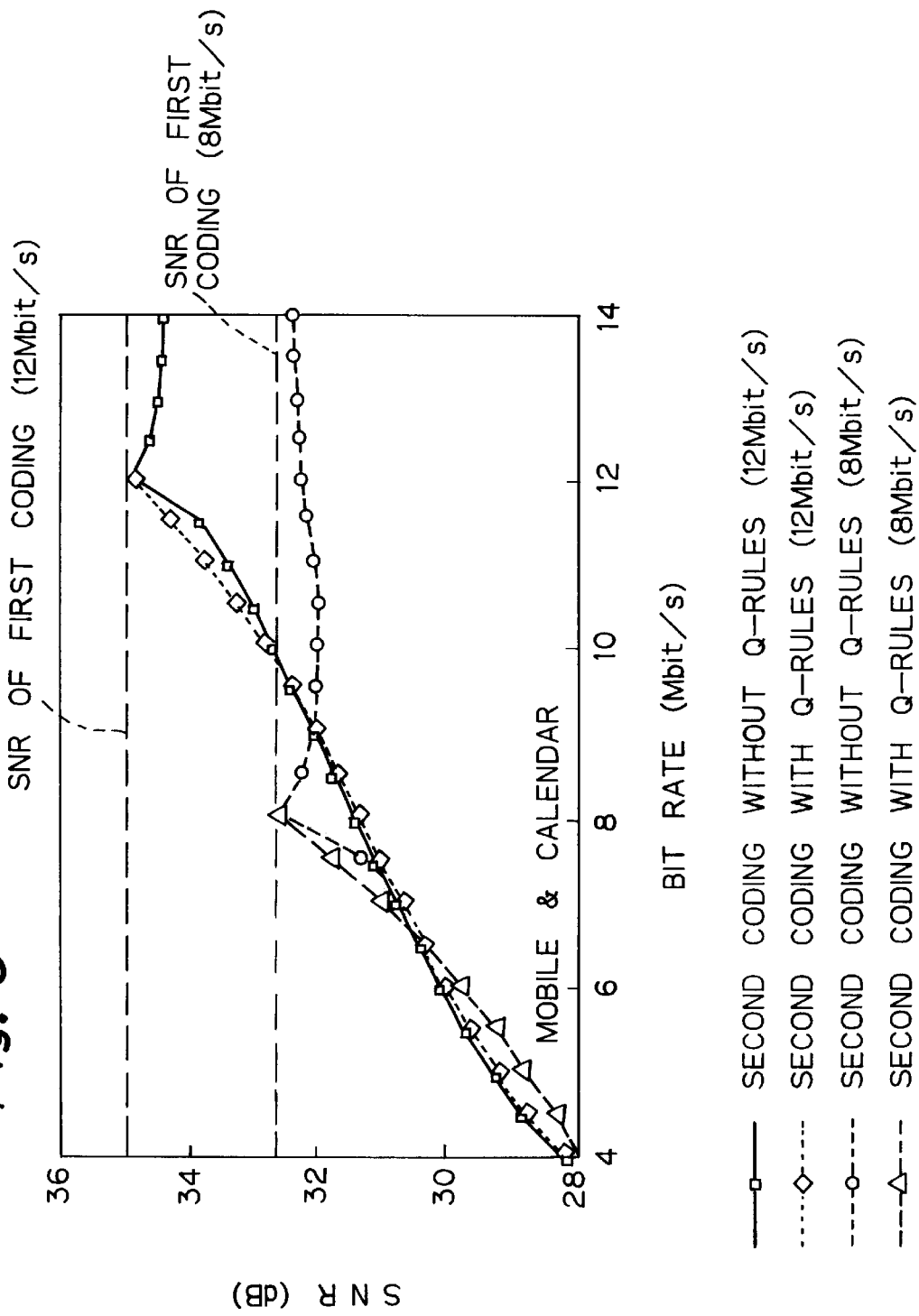
FIG. 9 illustrates characteristics of quality improvement by Q-rules for second coding.

FIG. 9 illustrates characteristics of picture quality in second coding using quantization step sizes with/without Q-rules. In the figure, the abscissas indicates a bit rate and the ordinate indicates a SNR.

As will be apparent from the figure, if the second coding uses Q-rules, second coded picture quality at slightly lower bit rate than the first coding bit rate is improved.

Following is an analysis why quantization noise can be decreased by the second coding with Q-rules.

When n is a quantization index, $Q_1$ is a quantization step size and $(n+1/2)Q_1$ is a representative value for n, or $$\left(n - \frac{1}{2}\right)Q_1 \leq x < \left(n + \frac{1}{2}\right)Q_1$$

the noise in the first quantization $E_1$ is given by:

$$E_1 = \frac{1}{dQ_1} \int_{(n-\frac{1}{2})Q_1}^{(n+\frac{1}{2})Q_1} (x - nQ_1)^2 dx$$

$$= \frac{1}{12d} Q_1^2$$

where d is a proportional constant for signal density. On the other hand, when the representative value of the first quantization is expressed by another quantization index m in the second quantization step size $Q_2$, or $$\left(m - \frac{1}{2}\right)Q_2 \leq nQ_1 < \left(m + \frac{1}{2}\right)Q_2$$

the noise in the second quantization is given by:

$$E_2 = \frac{1}{dQ_1} \int_{(n-\frac{1}{2})Q_1}^{(n+\frac{1}{2})Q_1} (x - mQ_2)^2 dx$$

$$= E_1 + \frac{1}{d}(nQ_1 - mQ_2)^2$$

$$= E_1 + \frac{1}{6d} q^2 (2k_2^2 - 3k_2 + 1)$$

where $Q_1 = k_1 q$, $Q_2 = k_2 q$, and $k_1$ and $k_2$ are prime natural numbers equal to or more than 1 (namely, q is the greatest common measure of $Q_1$ and $Q_2$).

Figure 10:
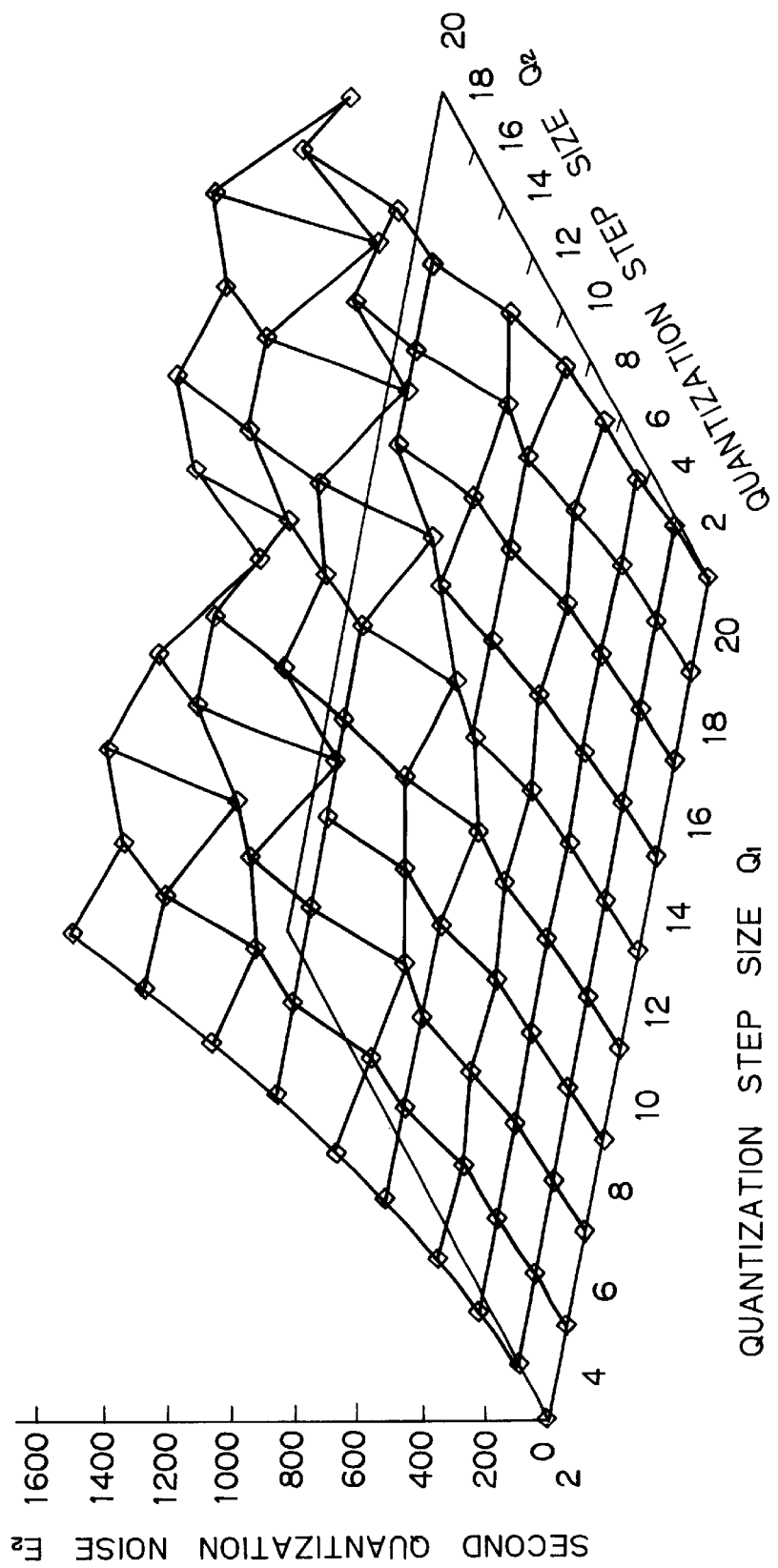
FIG. 10 illustrates characteristics of second quantization noise $E_2$ with respect to quantization step sizes $Q_1$ and $Q_2$.

The last equation can be expressed by characteristics of second quantization noise $E_2$ with respect to quantization; step sizes $Q_1$ and $Q_2$, shown in FIG. 10. It is apparent from the figure that the second quantization noise is relatively decreased when the second coding quantization step size $Q_2'$ is an integer multiple of the first coding quantization step size $Q_1$.

The picture block position decision part 72 decides picture block boundary position of the second coding so as to keep the block boundary in the previous coding without displacement.

The encoding unit 12 receives video signal for second or later coding, encodes the received information by using coding parameters from the coding control unit 13, and then outputs the second or tandem coded bit stream. Another constitutions and operations of this encoding unit 12 and the coding control unit 13 are the same as those of conventional video coding apparatus.

Hereinafter, constitutions and operations of the conventional video coding apparatus are simply described.

Such video coding apparatus has in general a series connection of a predictor with motion compensation, an orthogonal transformer, a quantizer, an encoder and a buffer, and output data from the buffer is fed back to a quantization controller so as to control the quantizer. The motion-compensating predictor detects motion of pictures between the current frame and the previous frame in a unit of M×M blocks by unit of for example a block matching strategy, produces a predicted picture of the current frame considering the detected motion, and outputs a difference picture between the predicted picture and the picture of the current frame. The orthogonal transformer divides the input difference picture into N×N blocks, orthogonally transforms the picture in each block by using DCT (Discrete Cosine Transform) for example, and outputs picture information of the respective blocks to the quantizer. The quantizer quantizes the picture information of each block in accordance with the provided quantization step size, and outputs the quantized picture information. The encoder codes the quantized picture information by using for example the Huffman coding strategy to produce VLC (Variable Length Code), and outputs the VLC coded picture information to the buffer. The buffer is constituted by a FIFO (First In First Out) memory to temporarily store the coded information and to output them in the FIFO manner at a constant bit rate. The quantization controller measures occupancy in the buffer at a predetermined interval, and determines a quantization step size applied to the quantizer depending upon the measured occupancy so as to control the amount of the coded information.

In the aforementioned embodiments, the picture type, the quantization step size and the picture block boundary are used as coding parameters. However, the second coding method and apparatus according to the present invention may use, in addition to the above-mentioned coding parameters, a picture format and/or a motion vector.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for second or later generation coding of a video signal in tandem stage coding which includes a previous stage coding process and a later stage coding process which are separately and sequentially executed, comprising the steps of:

estimating at least one coding parameter used in the previous stage coding process in accordance with picture properties of the video signal coded by said previous stage coding process; and secondly coding the video signal coded by said previous stage coding process based upon the estimated coding parameter.

2. The method as claimed in claim 1, wherein said estimating step includes a step of estimating cycle and phase of at least one picture type of previous stage coding in accordance with picture properties of the input video signal.

3. The method as claimed in claim 2, wherein said cycle and phase estimating step includes a step of coding the input video signal by using the picture type, a step of calculating a value representing picture quality of the coded video signal, and a step of picking up a phase of the picture type based upon the calculated value.

4. The method as claimed in claim 2, wherein said phase estimating step is a step of estimating I-picture of previous coding in accordance with picture properties of the input video signal.

5. The method as claimed in claim 2, wherein said cycle, estimating step is a step of estimating GOP cycle and/or I/P-picture cycles of previous stage coding in accordance with picture properties of the input video signal.

6. The method as claimed in claim 1, wherein said estimating step includes, a step of estimating a quantization step size of previous stage coding in accordance with picture properties of the input video signal.

7. The method as claimed in claim 1, wherein said estimating step includes a step of estimating a picture block boundary of previous stage coding in accordance with picture properties of the input video signal.

8. The method as claimed in claim 7, wherein said method further comprises a step of deciding a quantization step size of a second coding $Q_2$ with respect to a quantization step size of the previous stage coding $Q_1$ so as to satisfy $Q_2 \geq Q_1$ and $Q_2 = n \times Q_1$ where n is a natural number, and wherein said secondly coding step includes a step of secondly coding the input video signal based upon the decided quantization step size $Q_2$.

9. The method as claimed in claim 1, wherein said method further comprises a step of detecting whether the input video signal is provided with coding parameter information of the previous stage coding, and a step of executing said estimating step only when the input video signal is provided with the previous stage coding parameter information.

10. A method for second or later generation coding of video signal in tandem stage coding, comprising the steps of:
deciding a quantization step size of a second coding $Q_2$ with respect to a quantization step size of the previous stage coding $Q_1$ so as to satisfy $Q_2 \geq Q_1$ and $Q_2 = n \times Q_1$, where n is a natural number, and
secondly coding the input video signal based upon the decided quantization step size $Q_2$.

11. The method as claimed in claim 10, wherein said quantization step size of the previous stage coding $Q_1$ is estimated in accordance with picture properties of the input video signal.

12. The method as claimed in claim 10, wherein said quantization step size of the previous stage coding $Q_1$ is accompanied with the input video signal.

13. An apparatus for second or later generation coding of a video signal in tandem stage coding which includes a previous stage coding process and a later stage coding process which are separately and sequentially executed, comprising:
means for estimating at least one coding parameter used in the previous stage coding process in accordance with picture properties of the video signal coded by said previous stage coding process; and
means for secondly coding the video signal coded by said previous stage coding process, based upon the estimated coding parameter.

14. The apparatus as claimed in claim 13, wherein said estimating means includes means for estimating cycle and phase of at least one picture type of previous stage coding in accordance with picture properties of the input video signal.

15. The apparatus as claimed in claim 14, wherein said cycle and phase estimating means includes means for coding the input video signal by using the picture type, means for calculating a value representing picture quality of the coded video signal, and means for picking up a phase of the picture type based upon the calculated value.

16. The apparatus as claimed in claim 14, wherein said phase estimating means is means for estimating I-picture of previous coding in accordance with picture properties of the input video signal.

17. The apparatus as claimed in claim 14, wherein said cycle estimating means is means for estimating GOP cycle and/or I/P-picture cycles of previous stage coding in accordance with picture properties of the input video signal.

18. The apparatus as claimed in claim 13, wherein said estimating means includes means for estimating a quantization step size of previous stage coding in accordance with picture properties of the input video signal.

19. The apparatus as claimed in claim 13, wherein said estimating means includes means for estimating a picture block boundary of previous stage coding in accordance with picture properties of the input video signal.

20. The apparatus as claimed in claim 19, wherein said apparatus further comprises means for deciding a quantization step size of a second coding $Q_2$ with respect to a quantization step size of the previous stage coding $Q_1$ so as to satisfy $Q_2 \geq Q_1$ and $Q_2 = n \times Q_1$, where n is a natural number, and wherein said secondly coding means includes means for secondly coding the input video signal based upon the decided quantization step size $Q_2$.

21. The apparatus as claimed in claim 13, wherein said apparatus further comprises means for detecting whether the input video signal is provided with coding parameter information of the previous stage coding, and means for enabling said estimating means to operate only when the input video signal is provided with the previous stage coding parameter information.

22. A apparatus for second or later generation coding of video signal in tandem stage coding, comprising:
means for deciding a quantization step size of a second coding $Q_2$ with respect to a quantization step size of the previous stage coding $Q_1$ so as to satisfy $Q_2 \geq Q_1$ and $Q_2 = n \times Q_1$, where n is a natural number, and
means for secondly coding the input video signal based upon the decided quantization step size $Q_2$.

23. The apparatus as claimed in claim 22, wherein said quantization step size of the previous stage coding $Q_1$ is estimated in accordance with picture properties of the input video signal.

24. The apparatus as claimed in claim 22, wherein said quantization step size of the previous stage coding $Q_1$ is accompanied with the input video signal.

* * * * *